Nov. 10, 1959  E. J. WRAY  2,912,260
PIPE COUPLING HAVING A HAND OPERATED
SPRING BIASED CATCH MEANS
Filed July 6, 1954
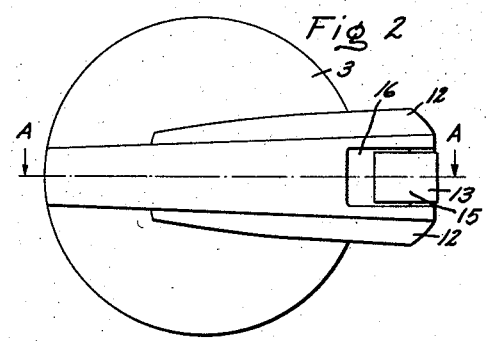
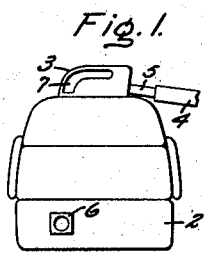
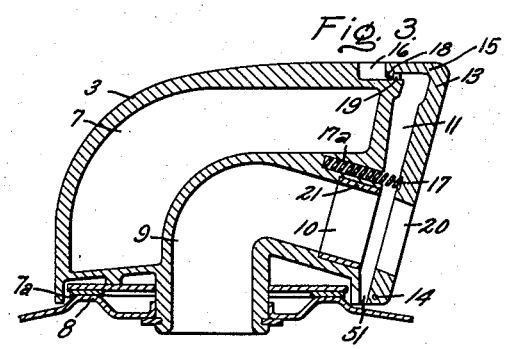
Inventor:
Edward J. Wray,
by *[signature]*
His Attorney.

United States Patent Office 2,912,260
Patented Nov. 10, 1959

2,912,260

PIPE COUPLING HAVING A HAND OPERATED SPRING BIASED CATCH MEANS

Edward John Wray, Barrie, Ontario, Canada, assignor to Canadian General Electric Company, Limited, Toronto, Ontario, Canada, a corporation of Canada Application July 6, 1954, Serial No. 441,447

2 Claims. (Cl. 285—7)

My invention relates to a hose or tube coupling and in particular to a detachable coupling which is simple to operate and yet provides a positive locking action.

The coupling of my invention is particularly useful for the attachment of a hose to a vacuum cleaner and will be described in this connection. In the use of a vacuum cleaner of the tank type, it is convenient and customary to pull it around by means of the air inlet hose. Since the air inlet hose is detachable from the cleaner body in order to make it compact and portable, it is readily seen that a secure and dependable coupling is necessary between the hose and the cleaner and at the same time this coupling must be simple enough for the average housewife to operate.

It is therefore an object of my invention to provide such a coupling which is both simple in operation and capable of joining two members together by means of a tight gripping action.

The invention together with further objects and advantages thereof can best be understood from the following detailed description taken in cooperation with the accompanying drawing in which Figure 1 is a view on a small scale of a vacuum cleaner to which my invention has been applied; Figure 2 is a plan view showing the top of the cleaner and is on a larger scale; Figure 3 is a section on the line AA of Fig. 2; Figure 4 is a section similar to Figure 3 with the parts in another position and with the hose applied; Figure 5 is a section illustrating a modification; Figures 6 and 7 are sections similar to Figure 5 but with the parts in different positions, Fig. 7 showing the hose attached; Figure 8 is a central section of a further modification and Fig. 9 is a section similar to Fig. 8 but with the parts in different positions and with the hose applied.

Referring to the drawings, I have illustrated a tank cleaner 2 of the upright type commonly referred to as a canister cleaner. This cleaner is shown provided with a swivel top 3 having a circular air inlet opening 10 into which a hose 4 may be inserted. The air hose 4 is usually rubber or rubber and fabric for flexibility and is shown in Fig. 1 provided with a rigid ferrule 5 for insertion in the inlet opening 10. In operation, air is drawn along the hose 4 and into the cleaner through inlet opening 10 by means of a motor-driven fan located in the body of the cleaner. The air is passed over a filter and then discharged through openings in the cleaner circumference. An additional opening 6 is provided for use when it is desired to use the cleaner as a blower. In this case the air hose is coupled to the opening 6 which is kept closed during normal operation of the cleaner. In Figs. 8 and 9 I have illustrated a coupling of my invention used in connecting the hose 4 to the blower opening 6.

The cleaner 2 is moved around the room by pulling on the hose 4. Consequently a firm joint is necessary at the coupling of the hose in the inlet opening 10. At the same time it is desirable to provide an easy means for attaching and detaching the hose from the cleaner. In Figs. 3 and 4 I have shown a section through the line AA of Fig. 2 illustrating details of the connection to the swivel top 3 of the cleaner. The top 3 may be a die cast housing provided with a hand hole 7 and mounted for rotation on the top 8 of the cleaner 2 along a bearing surface 7a which circumscribes an air tube or passage 9 leading from the interior of the cleaner body to the air inlet opening 10. The air inlet opening is located in a recess 11 in the top 3 between a pair of spaced walls 12. A locking plate 13 is pivotally mounted in the recess 11 at a point 14 for movement between walls 12, toward and away from the inlet opening 10. A compression spring 17 mounted in a hole 17a normally biases the plate 13 away from the opening 10. The plate is provided with a flange portion 15 at its upper end away from the pivot point 14. This flange portion projects into a recess or indentation 16 in the top 3 of the cleaner when the plate 13 is moved toward opening 10. The movement of the plate away from opening 10 is limited by means of a stop 19 projecting up from the base of the recess 16 for cooperation with a lip 18 at the end of flange 15.

The locking plate 13 is provided with a circular hole 20 of the same size as opening 10 and is so positioned that upon movement of the plate 13 against the pressure of spring 17 hole 20 lines up with air inlet opening 10 when the plate contacts the base of recess 11 in the cleaner top 3.

In operation, the ferrule 5 on the hose 4 may be coupled to air inlet opening 10 by pushing the plate 13 from its normal position as shown in Fig. 3 into engagement with the base of the recess 11 in order to line up hole 20 with opening 10. The ferrule 5 on hose 4 may then be coupled to air inlet opening 10 by inserting the ferrule in the hole 20 and pushing it into opening 10. Upon release of the plate 13, it pivots away from the top 3 about point 14 so that hole 20 no longer is in alignment with opening 10. The periphery of hole 20 binds against the ferrule 5 as shown in Fig. 4, thereby preventing its removal from opening 10. Pulling on the hose 4 tends to increase the binding action between the locking plate 13 and the ferrule 5 so that the hose cannot be accidentally disengaged from the cleaner. When it is desired to release the hose coupling, locking plate 13 is again pivoted into a position engaging the base of the recess 11 so that the hole 20 is lined up with opening 10 thereby permitting the release of ferrule 5. I have illustrated an annular insert 21 made of wear resistant material mounted in opening 10. This is desirable in order to prevent the ferrule 5 from slipping out of the opening as a result of the gradual wearing of the opening periphery. It is not necessary to mount such an insert in the hole 20 since wear on the periphery of hole 20 merely allows the locking plate 13 to slip farther along on the ferrule until the binding action again becomes effective.

I have shown the pivot point 14 of locking plate 13 spaced away from the base of the recess 11 by an amount sufficient to provide a passage 51 opening outside the cleaner so that dirt cannot collect in the portion of the recess 11 between the locking plate and the main portion of the top 3 and thereby hinder the movement of the plate 13.

In Figs. 5, 6 and 7 I have shown a modified form of my invention again applied to the swivel top of a canister type vacuum cleaner. The swivel top is shown at 22 provided with an air passage or tube 23 leading from inlet 26 to the interior of the cleaner.

A slot 24 is formed by an internal annular groove which intersects the air passage 23 adjacent the end of the passage at which air is admitted. The outer face 28 of the slot 24 is flat and sloped at an acute angle to the longitudinal axis of the air passage and the inner face 25 of the slot 24 is flat and perpendicular to the longitudinal axis of the air passage so that the slot tapers in width from the top of the air passage to the bottom. Sufficient space is provided at the bottom of the slot to allow a narrow locking ring 27 to be supported in the slot so that the ring can pivot about its lower edge as indicated at 29. The ring 27 projects above the upper edge of the air passage 23 into a recess 31 in the swivel top 22 where it engages in a depression 35 in a plunger or pushbutton 33 backed up by a compression spring 30. The plunger 33 extends through the open end of the recess 31.

The ring 27 is normally biased towards the position shown in Fig. 5 by the compression spring 30. When it is desired to couple the hose 4 to the air passage 23, the ferrule 5 is inserted in the inlet 26, thereby forcing the locking ring 27 against the spring bias toward the face 25 of the slot 24 as shown in Fig. 6. Movement of the ring towards the face 25 of slot 24 also moves the plunger 33 against its spring bias. When in this position the opening in the ring 27 lines up with the air passage 23 so that the ferrule 5 may be pushed through the slot into the air passage. When the ferrule 5 has been forced through the opening in the ring 27 spring 30 urges the ring forward into the position shown in Fig. 7 where it binds against the ferrule 5 thereby preventing the accidental removal of the hose. It will be apparent that any pulling force exerted on the hose will cause the ring 27 to increase its binding action and cause the ferrule 5 to be held more tightly. Pressure on the end of plunger 33 will release the coupling by moving the ring 27 back into alignment with the air passage 23 thereby permitting the removal of the ferrule. While I have described the coupling shown in Figs. 5, 6 and 7 using a locking ring 27, it is obvious that any thin plate provided with a hole may be used in place of a ring.

I have shown hard metal inserts positioned on both sides of the slot 24 so that wear will be kept to a minimum. A passage 52 is provided extending from the narrow portion of slot 24 to the outside of the top 22 to allow any dirt collecting in the slot to escape.

Fig. 8 shows a further modification of my invention. In this case it is shown adapted to be applied to the blower outlet on a vacuum cleaner although it is apparent that my modification is applicable to many different cases where it is necessary to provide a simple and reliable coupling between two tubes or pipes. It is usual to provide an outlet opening in a vacuum cleaner communicating with the exhaust end of the fan so that the air hose may be coupled to the exhaust for blowing operations if so desired. Such an outlet is shown at 6 in Fig. 1. In Fig. 8 I have shown a locking plate housing 40 secured to the outer wall 45 of the cleaner adjacent an air exhaust outlet 46 which communicates with the exhaust chamber of the fan. The housing 40 comprises a casting 42 provided with a circular opening 41 equal in size to outlet 46 and aligned therewith. The face of casting 42 adjacent the cleaner wall 45 is provided with a tapered recess 47. Locking plate 44 provided with a hole is supported in the recess 47 and is free to pivot about its lower periphery in the narrow portion 48 of recess 47. The upper portion of the plate 44 is held in a groove 49 in a pushbutton or plunger 50.

The plate 44 is normally spring biased towards the opening 41 by means of a flat spring 50a mounted at one end on the cleaner wall 45. The free end of the spring extends over the pushbutton for engagement therewith. In order to connect a hose to the blower outlet 46, ferrule 5 is inserted into opening 41 forcing plate 44 toward the outlet 46 so that the hole in plate 44 is in alignment with opening 41 and outlet 46 thereby freely allowing the insertion of the ferrule 5 into the outlet 46 through opening 41. Movement of the plate 44 toward outlet 46 forces the button 50 against its spring bias 50a so that upon insertion of the ferrule into outlet 46, plate 44 is released and is urged by spring 50a into a locking position binding against the ferrule 5 as shown in Fig. 9. As in the other examples, the ferrule is held firmly even though the hose is pulled forward and may be released by pressing on button 50. Release of the ferrule is effected by pressing on the button 50 and pulling on the hose.

It will thus be apparent that I have provided a coupling which is capable of joining together a pair of members such as tubes, hoses, or pipes in a tight gripping action. This tight gripping action is provided while at the same time ensuring a reliable joint which can be made with very little skill. The coupling is compact and may be designed to form part of one of the members to be coupled so that it does not detract from the appearance. In addition I have provided a very simple release mechanism whereby the coupling may be readily broken.

The coupling of my invention does not require any deformation of either of the members to be coupled. Many coupling devices for tubular members in the prior art require a detent or latch to be positioned within at least one of the members. This is detrimental in applications to such devices as vacuum cleaner hoses since it is desirable not to impede the flow of air through the hoses and air inlets or outlets to the cleaner.

While the present invention has been described with reference to particular embodiments thereof, it will be understood that numerous modifications may be made by those skilled in the art without actually departing from the invention. For example, I have illustrated my invention in various forms all applicable to the coupling of an air hose or tube to a vacuum cleaner air inlet or outlet. It will be readily apparent that my invention is just as applicable to the coupling together of a pair of such tubes or hoses or to the coupling of a tube or hose to a passage or cavity in some other device. Therefore I aim in the appended claims to cover all such equivalent variations as come within the true spirit and scope of the foregoing disclosure.

What I claim as new and desire to secure by Letters Patent of the United States is:

1. An air inlet assembly for a vacuum cleaner comprising a housing having an air inlet at one end of an air passage located within the housing, the other end of said air passage communicating with the body of the vacuum cleaner, a slot formed by an internal annular groove in said housing which intersects said air passage adjacent the air inlet, said slot having a flat inner face perpendicular to the longitudinal axis of the air passage and a flat outer face at an acute angle thereto so as to render said slot tapered, a locking plate positioned in said slot for pivoting about its edge which is confined in the narrow portion of the slot, a hole in said plate equal in size to the air passage, a hand operated spring biased plunger disposed in a longitudinal hole that is formed in the housing and which is spaced from the air passage adjacent the air inlet, said plunger being wholly disposed outside of said air passage, a depression in said plunger for cooperation with the free portion of said locking plate remote from the confined pivoting edge, said spring biased plunger normally being biased so as to hold the plate against the outer face of the slot and extending beyond the housing in the vicinity of said one end of said air passage whereby movement of the plunger against its spring bias pivots the locking plate such that its opening is brought into alignment with the air passage thereby permitting the insertion of an air tube in said housing, the release of said plunger effecting the locking of the air tube in the housing.

2. An air inlet assembly for a vacuum cleaner as claimed in claim 1 in which the housing is provided with a passage connecting the narrow portion of the slot with the outside of the housing to permit the escape of dirt from the slot.

(References on following page)

References Cited in the file of this patent

UNITED STATES PATENTS

| | | |
|---|---|---|
| 1,096,690 | Derbyshire | May 12, 1914 |
| 1,415,602 | Myer and Roos | May 9, 1922 |
| 1,447,519 | Schade | Mar. 6, 1923 |
| 1,484,528 | Paquette | Feb. 19, 1924 |
| 1,593,029 | Pagliarul | July 20, 1926 |
| 1,844,760 | Haynes | Feb. 9, 1932 |
| 1,879,581 | Stougaard | Sept. 27, 1932 |
| 2,125,477 | Whitney | Aug. 2, 1938 |
| 2,268,456 | Meyer | Dec. 30, 1941 |
| 2,360,732 | Smith | Oct. 17, 1944 |
| 2,447,221 | Warring | Aug. 17, 1948 |
| 2,483,395 | Benson | Oct. 4, 1949 |
| 2,537,740 | Churchman et al. | Jan. 9, 1951 |
| 2,664,259 | Rose | Dec. 29, 1953 |

FOREIGN PATENTS

| | | |
|---|---|---|
| 205,994 | Great Britain | Nov. 1, 1923 |
| 284,564 | Great Britain | Feb. 2, 1928 |